US011587399B2

(12) United States Patent
Lee et al.

(10) Patent No.: US 11,587,399 B2
(45) Date of Patent: Feb. 21, 2023

(54) ELECTRONIC GAMING USING MULTIPLE VIRTUAL CURRENCIES

(71) Applicant: FLUIT LTD., London (GB)

(72) Inventors: Yonatan Moshe Lee, Herzliya (IL); Lior Shimon Gabay, London (GB); Venthan Poologasuntharampillai, Grand Cayman (KY)

(73) Assignee: FLUIT LTD., London (GB)

( * ) Notice: Subject to any disclaimer, the term of this patent is extended or adjusted under 35 U.S.C. 154(b) by 0 days.

(21) Appl. No.: 17/696,283

(22) Filed: Mar. 16, 2022

(65) Prior Publication Data

US 2022/0207961 A1 Jun. 30, 2022

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ...... *G07F 17/3255* (2013.01); *G07F 17/3211* (2013.01); *G07F 17/3225* (2013.01); *G07F 17/3262* (2013.01)

(58) Field of Classification Search

CPC ............................ G07F 17/32; G07F 17/3213

USPC .................................... 463/1, 20, 22, 25, 30

See application file for complete search history.

(56) References Cited

U.S. PATENT DOCUMENTS

| | | | |
|---|---|---|---|
| 10,580,256 | B2 | 3/2020 | Escalante |
| 11,132,865 | B2 | 9/2021 | Escalante |
| 2022/0044525 | A1 | 2/2022 | Escalante |

*Primary Examiner* — Adetokunbo O Torimiro

(74) *Attorney, Agent, or Firm* — Panitch Schwarze Belisario & Nadel LLP

(57) ABSTRACT

Aspects of the present disclosure may address a virtual gaming system. The virtual gaming system may present various graphical user interfaces (GUIs) to a user, in conjunction with a device used by the user, in a client-server configuration. The virtual gaming system may facilitate play of games using at least two virtual currencies, where one virtual currency is purchased and has no monetary value and the second virtual currency may not be purchased but has monetary value. Separate sets of games may be provided for play using the at least two virtual currencies. It may also be possible, in some cases, to obtain first virtual currency, second virtual currency, or both, other than by purchase.

27 Claims, 12 Drawing Sheets

ELECTRONIC GAMING USING MULTIPLE VIRTUAL CURRENCIES

FIELD

Some aspects of this disclosure may relate to electronic gaming that employs two or more types of virtual currencies and techniques for their use, where at least one of the types of virtual currencies is not available to be purchased.

BACKGROUND

Electronic gaming or Internet gaming (e-gaming or i-gaming) systems have proliferated at a high rate in recent years. E-gaming systems range from sportsbooks to on-line casino games. Typically in casino-type games, a user registers with a gaming service/system and purchases virtual currency that enables the user to participate in the games offered, which may include, for example, but are not limited to, slot machines, roulette, etc.

While most of this proliferation of e-gaming has historically taken place outside of the United States, in countries where gambling is legal and individuals "buy-into" games and receive cash awards for winning, e-gaming has also gained traction in the United States, where casino-type games, e.g., virtual slot machine-based games, have been made available for use.

Typically, an individual who plays such games may receive an initial number of tokens, simply for registering to play. Some systems provide a daily allotment of additional tokens. But an individual who would like to continue to play beyond the tokens he or she has received (and without waiting for a further allotment of tokens, if any) may purchase additional tokens. Winners of such games may typically receive only tokens as prizes for winning.

More recently, e-gaming systems of this type have considered implementing other ways of playing. One way of doing this is by providing two types of virtual currency, one for purchase that permits a user to play games "for fun," i.e., with no cash or other types of non-virtual-currency prizes (i.e., more tokens, as in the preceding paragraph), and one that permits a user to play games with the hope of winning cash or prizes having cash value, with the outcome determined purely by luck/chance. The latter is often referred to as a sweepstakes, and the virtual currency associated with the sweepstakes may be called, for example, "sweepstakes coins" or "non-monetary currency." For an example of such a system, see, for example, U.S. Pat. Nos. 10,580,256 and 11,132,865, which are incorporated by reference herein.

In a system according to the aforementioned U.S. patents, two types of virtual currency exist: "gold coins" and "sweepstakes coins." Gold coins may be purchased by users and used to play a set of casino-type games, such as virtual slot machines, blackjack games, etc. Sweepstakes coins may be obtained, e.g., as a bonus for purchasing gold coins, as giveaways, as incentives, by mail-in request, in contests, etc. In these patents, a user playing a game, for example, using gold coins, is given the option to switch to playing the same game using sweepstakes coins.

Such a system, in which a player is permitted to simply switch between currencies while playing the same game, may lead the player to be confused about which currency she is using at a given time and to inadvertently use the wrong virtual currency (e.g., use sweepstakes coins or gold coins when the player intends to use the other type of coin). It also requires the system to track which currency the player is using and, accordingly, what type of award is available to that player. Therefore, alternative methods of applying the two (or more) virtual currencies may be desirable.

SUMMARY

Various aspects of the present disclosure may relate to e-gaming in which multiple virtual currencies may be used. At least one of the virtual currencies may be available for purchase and may be used to play games in which no monetary or prizes of value can be won. At least one of the virtual currencies may be obtained via means other than purchase and may be used to play games in which it may be possible to redeem winnings for cash or prizes of some value. The games for the different virtual currencies may be different from each other and may require separate access within the system, which may permit the user to clearly know which virtual currency is being spent at any given time and may help simplify the system implementation and operation.

According to various aspects of the present disclosure, the e-gaming system may be accessed via computer (desktop, laptop, etc.) or mobile device (laptop computer, tablet computer, smartphone, PDA, etc.), using a web browser or a dedicated application ("app"). It may also be possible to access using a dedicated gaming kiosk.

Various aspects of the present disclosure may take the form of hardware, software, firmware, or combinations thereof, and software forms may be in the form of instructions embodied on a non-transitory computer-readable medium, such as, but not limited to, various forms of memory.

BRIEF DESCRIPTION OF THE DRAWINGS

Various aspects of this disclosure will now be described in detail in conjunction with the accompanying drawings, in which.

DETAILED DESCRIPTION

Figure 1:
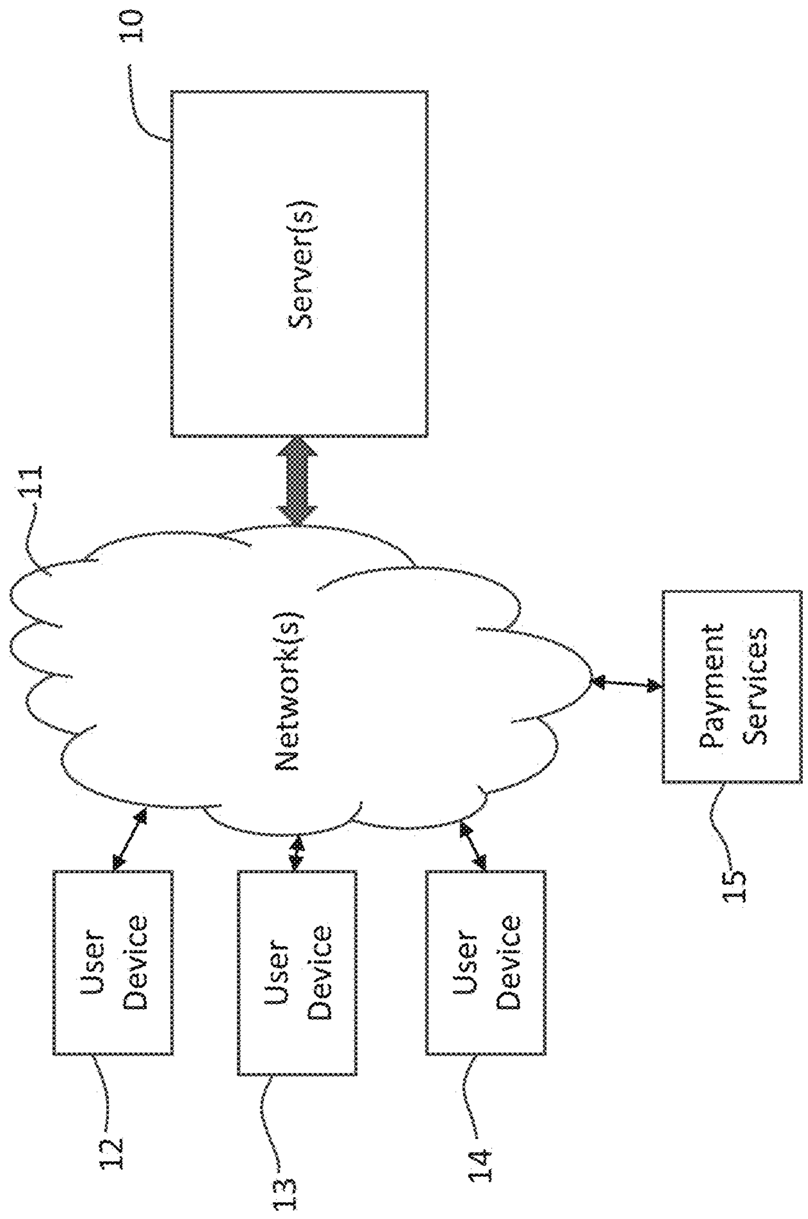
FIG. 1 shows an example of a system that may be used to implement various aspects of this disclosure.

FIG. 1 presents a high-level conceptual diagram of a system that may be used to implement aspects of the present disclosure. A gaming system according to FIG. 1 may be implemented in the form of a client-server type of architecture. One or more servers 10 may be provided, which may provide gaming services in cooperation with one or more user devices 12-14, which may be coupled to the one or more servers 10 via one or more communication networks 11. The user devices may include mobile/portable devices 12, which may include, but are not limited to, laptop computers, tablet computers, smartphones, personal digital assistants (PDAs), etc., desktop computing devices 13, and/or gaming kiosks 14, which may be standalone stations that may be used to allow users to play games on a walk-up basis, e.g., at a casino or other establishment where gaming is permissible.

Network(s) 11 may include the Internet, wireless networks, local area networks (LANs), wide-area networks (WANs), or any other types of wired or wireless communication networks, including dedicated connections (e.g., a kiosk 14 may be directly connected by a cable or a point-to-point wireless link to a server 10).

In order to arrange for payments, user devices 12-14 and/or one or more servers 10 may be coupled to one or more payment systems 15; this coupling may be via the one or more communication networks 11. Payment systems 15 may include, for example, but are not limited to, banks, PayPal®, credit card companies, and/or other payment methods/institutions. Payment systems 15 may permit users to pay for purchases of virtual currency to play games and may be used to provide refunds and/or cash payments from the gaming system to users. That is, users may request payments to the system, and the system may request payments to the users.

Figure 2:
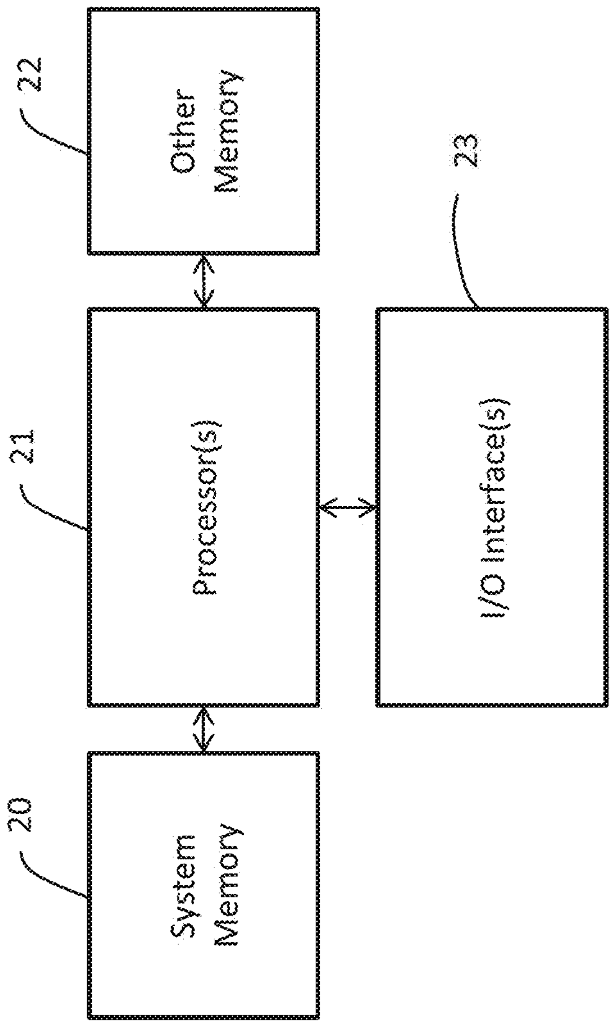
FIG. 2 shows a further system that may be used to implement various aspects of this disclosure.

FIG. 2 presents a high-level conceptual diagram of various components of the system. In particular, it may represent a user device 12-14 or a server 10. In general, these components may include a one or more processors 21, which may be coupled to system memory 20, other memory 22, and/or one or more input/output (I/O) interfaces 23. The system memory 20 and the other memory 22 may be physically embodied in common memory devices, or they may be embodied in separate memory devices. System memory 20 may store instructions and data that enable the basic functionality of the processor(s) 21 as computing device(s), e.g., basic input/output system (BIOS), operating system, drivers, etc., and associated data (e.g., settings). Other memory 22 may be used to store instructions and data associated with application programs, such as, but not limited to, software and data for implementing a gaming system. The I/O interface(s) 23 may include user interfaces, such as a keyboard, a mouse, a touchpad, a touchscreen, etc., as well as communication interfaces for communication via hard-wired and/or wireless connections.

Such communication interfaces may include communication processors to control communications in accordance with various communication protocols (e.g., but not limited to, Internet Protocol (IP), Hypertext Transport Protocol (HTTP), 3GPP wireless protocols (e.g., 3G, 4G, LTE, 5G, etc.), IEEE 802.11, Bluetooth®, RS-232, et al.) and may include the necessary hardware interfaces for such communication (e.g., receivers/transmitters/transceivers, antennas, modems, codecs, filters, mixers, signal generators, etc.).

The server(s) 10 and user device(s) 12-14 may work together to enable user(s) to play games in the gaming system. For example, the server(s) 10 may provide a graphical user interface (GUI) in a web browser on the user device(s) 12-14. The server(s) 10 may also work in cooperation with one or more dedicated applications ("apps") on the user device(s) 12-14 to provide one or more GUIs to provide a gaming experience to the user(s).

Figure 3:
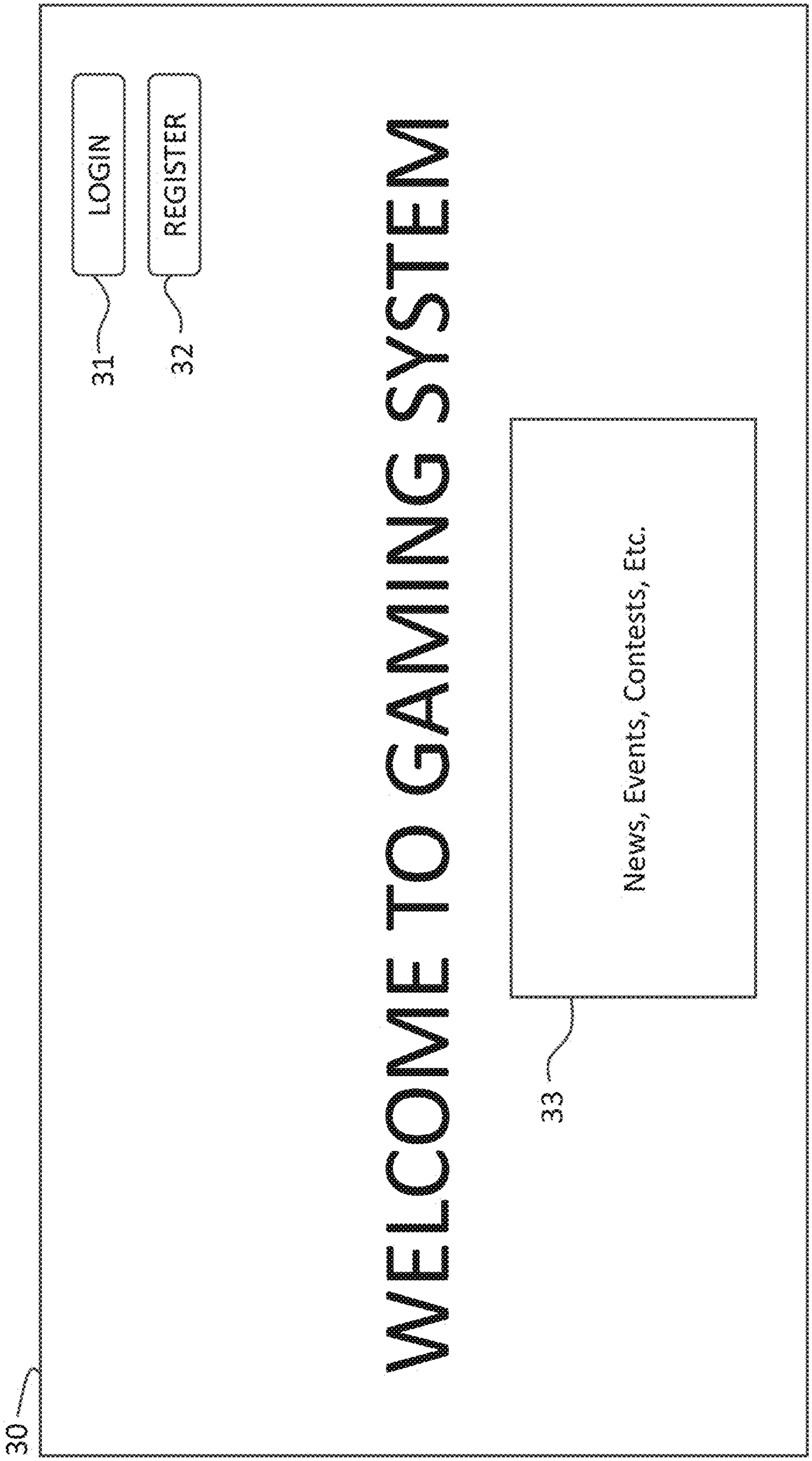
FIG. 3 shows an example of a graphical user interface (GUI) that may be used according to aspects of this disclosure.

When a user goes to a web site of the gaming system or invokes an app associated with the gaming system, the user may first encounter a "welcome screen" GUI 30, e.g., as shown in FIG. 3. The welcome screen GUI 30 may include login 31 and registration 32 options to facilitate logging into the gaming system and registration with the gaming system, respectively.

Alternatively, a single "button" for login and registration (not shown) may be used and may direct the user to a further GUI to permit the user to make this choice, depending upon the user's status. Registration may be needed prior to permitting a user to login.

Figure 4:
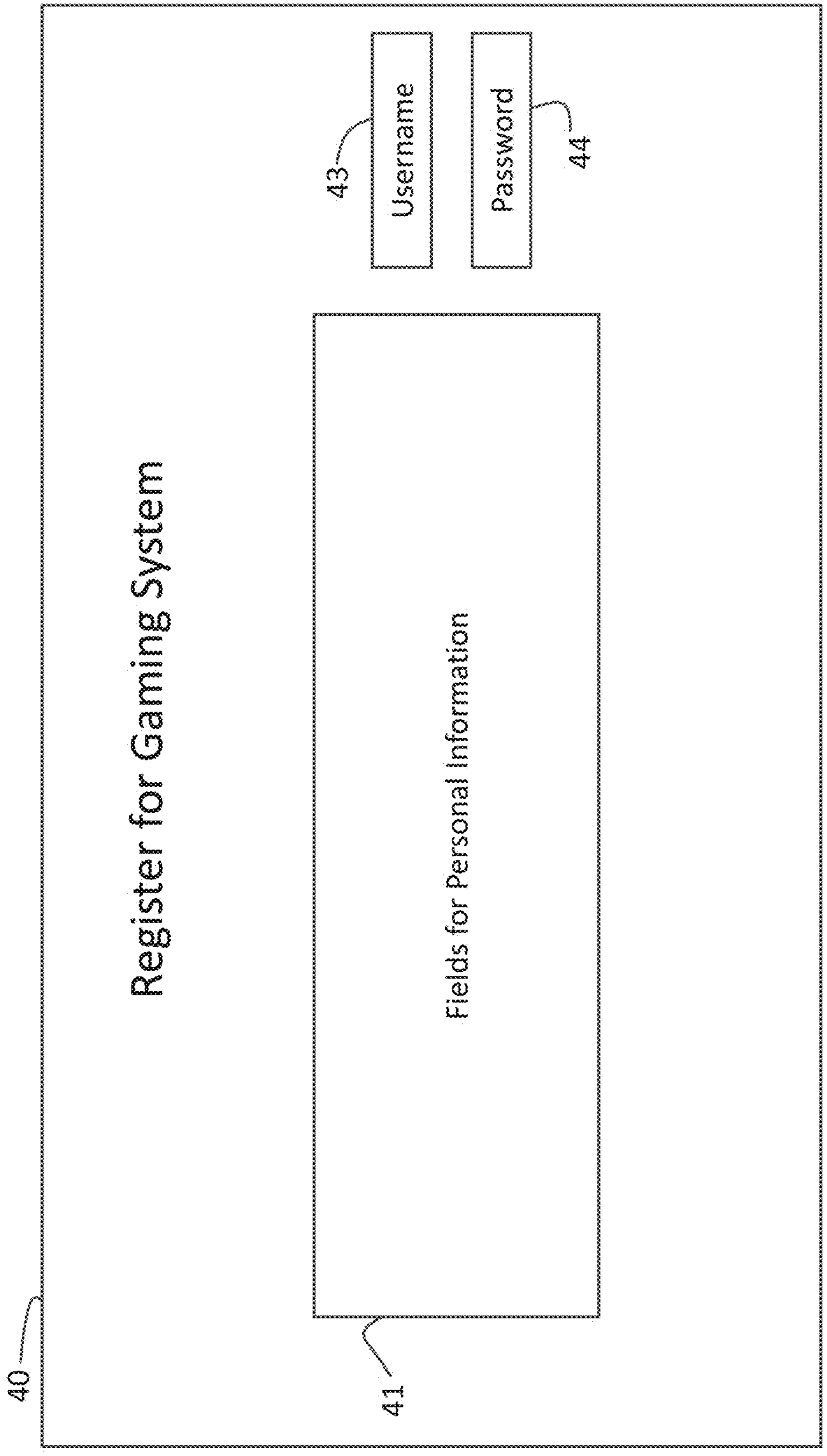
FIG. 4 depicts an example of a registration GUI that may be used according to aspects of this disclosure.

FIG. 4 shows a registration page/screen 40 that may be used according to some aspects of the present disclosure. As previously noted, a user may be required to register with the gaming system prior to logging in and accessing opportunities to play. For example, the GUI of FIG. 3 may indicate that new users must select a "Register" option (button or the like) prior to being able to login. Upon opting to register, a user may be prompted to enter personal information, such as, for example, name, address, e-mail, telephone number, etc., in fields 41. The user may further be prompted to enter a username 43 and a password 44 (as is well-known the user may be required to repeat the password to verify it); security questions and answers (not shown) may also be required. The system may then process the information entered and may establish an account associated with the username 43 and password 44 and the entered user information 41.

Figure 5:
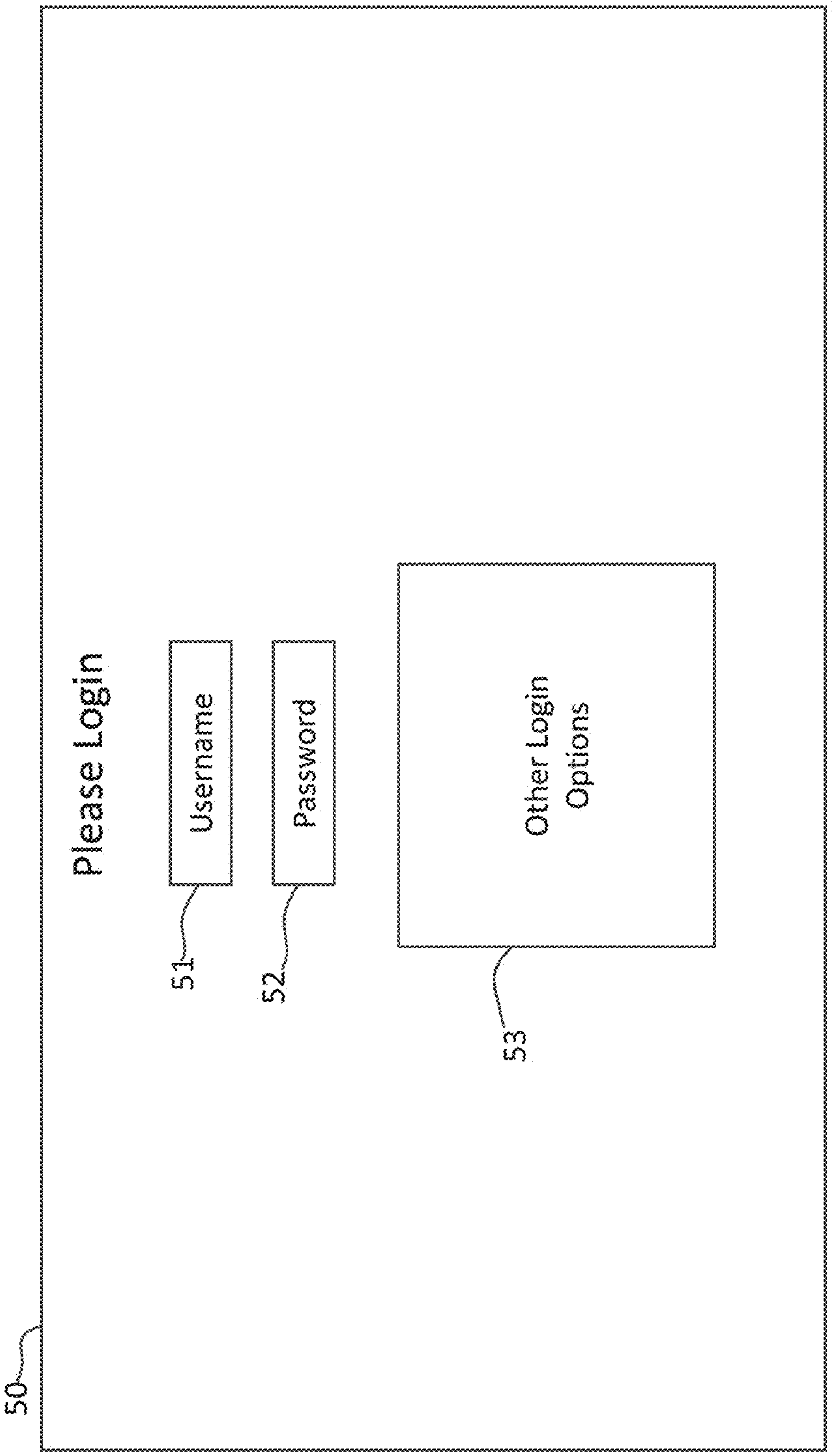
FIG. 5 presents an example of a login GUI that may be used according to aspects of this disclosure.

FIG. 5 presents a login GUI 50 according to various aspects of the present disclosure. A user who is registered with the gaming system may be prompted to enter his/her username 51 and password 52. Other information may be requested 53 (e.g., answers to previously established security questions) and/or the user may be prompted for a verification code that may be sent to the user using the user's registered e-mail account or telephone number (which may be via voice call or text (SMS) message). Upon successful login, the user may then be directed to an initial "lobby."

Figure 6:
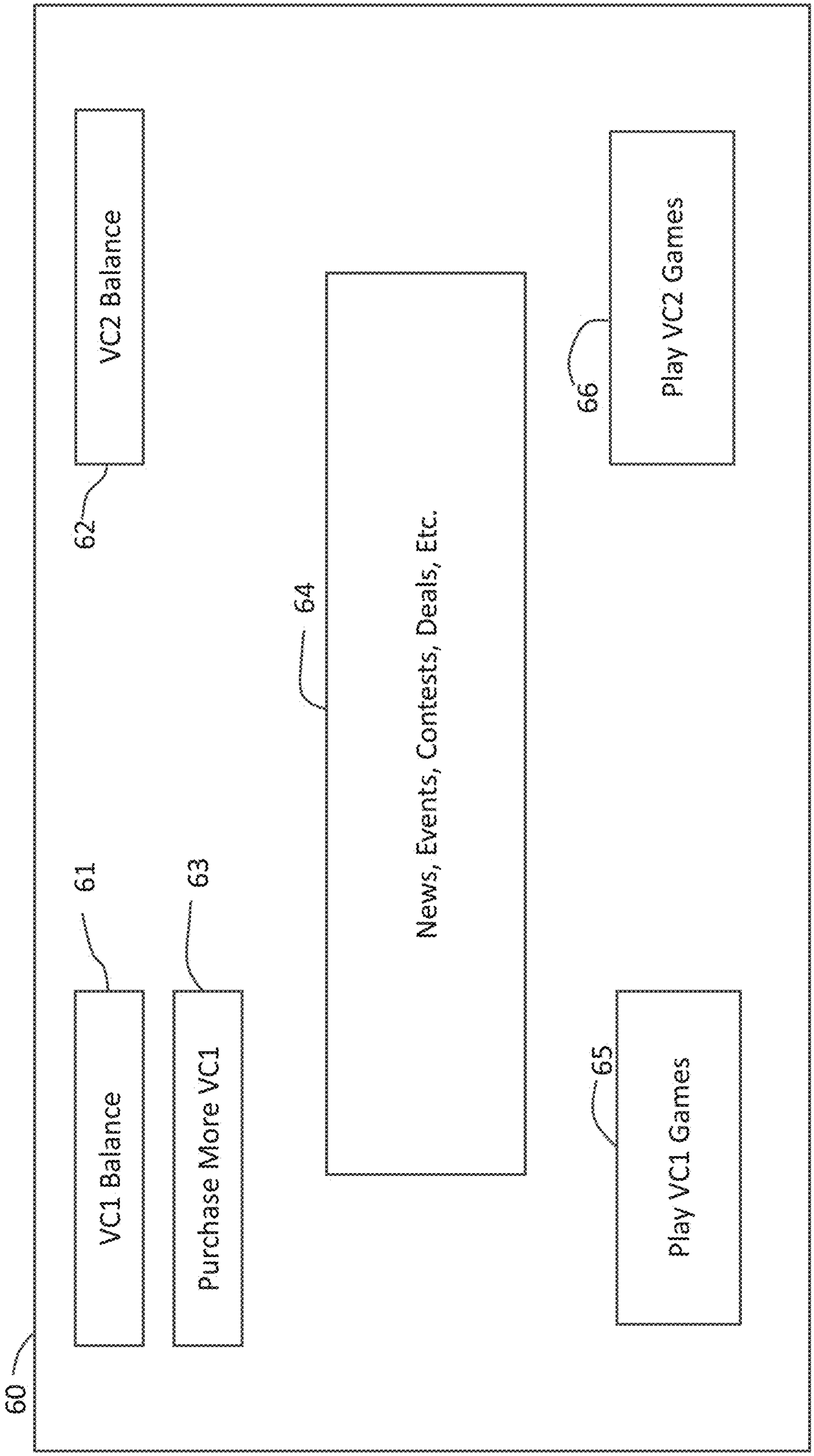
FIG. 6 shows a conceptual example of a GUI corresponding to an initial entry ("main lobby") to a gaming system according aspects of this disclosure.
Figure 6A:
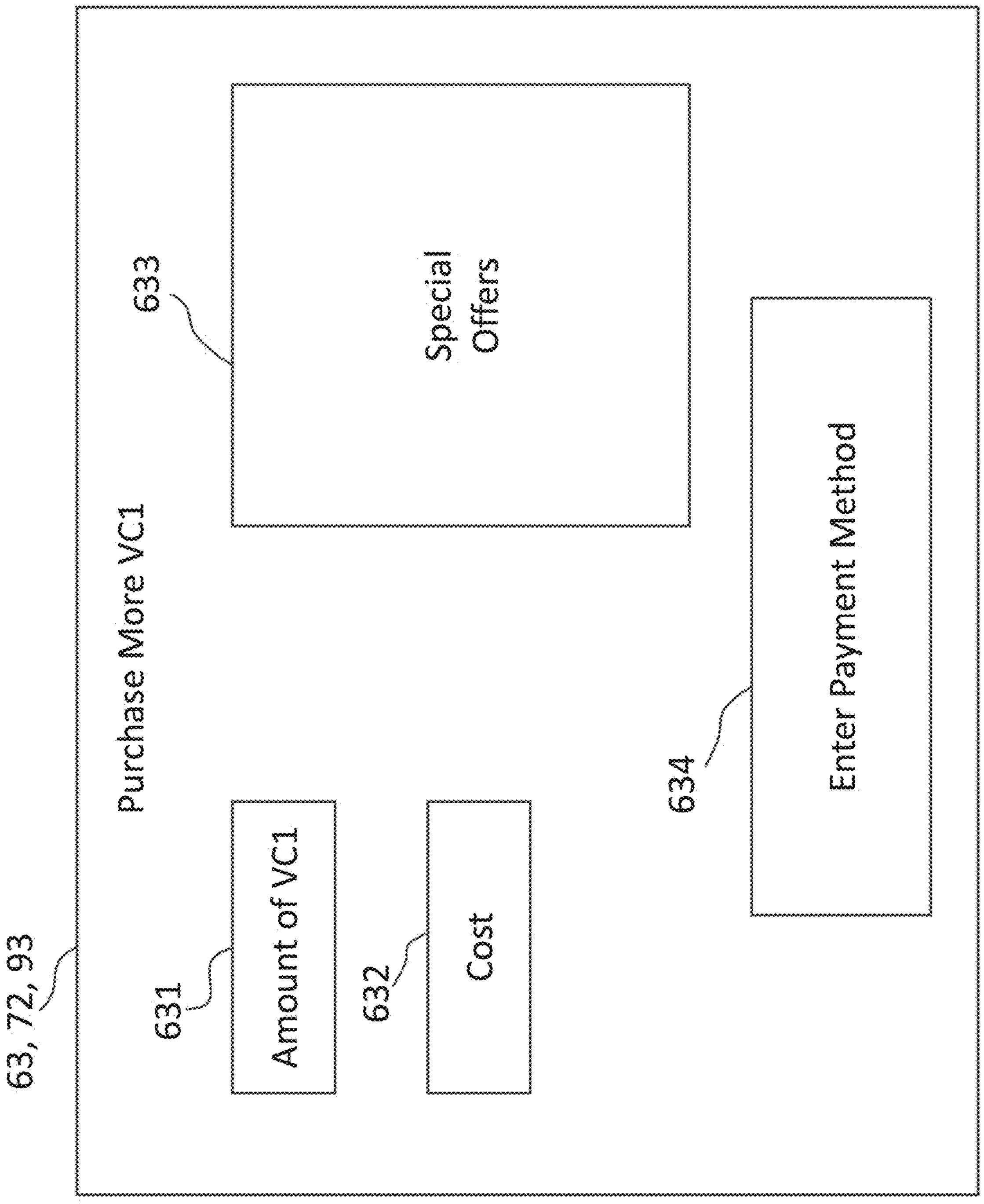
FIG. 6A shows a conceptual example of a GUI corresponding to purchasing virtual currency according to various aspects of the present disclosure.

FIG. 6 shows an example of such an initial or "main" lobby 60 according to various aspects of the present disclosure. Main lobby 60 may be a GUI that may inform the user about his/her virtual currency balances 61, 62. In the example of FIG. 6, two virtual currencies, VC1 and VC2, are shown, and it is assumed that VC2 represents sweepstakes/non-monetary currency (see above), while VC1 represents virtual currency that may be purchased to play games that do not award cash or prizes other than in the form of VC1. Main lobby 60 may also provide the user with an opportunity to purchase VC1 63 by directing the user to a purchase GUI, and example of which is shown in FIG. 6A. The purchase GUI 63 (which may also be reached from element 72 of FIG. 7 and/or element 93 of FIG. 9A) may prompt the user for an amount of VC1 to be purchased, either in the form of a quantity of VC1 desired 631 or in terms of an amount of money to be spent 632. A regular rate of VC1 for cash may be displayed (not shown), and field 633 may display special offers (e.g., but not limited to, discounts (reduced price or bonus VC1) on certain purchase amounts, bonus VC2 included with purchases of various amounts of VC1, etc.). In the case of purchases made at a standard rate or amount, the user may enter the amount of VC1 desired in field 631, which the system may translate into an amount of money that may be displayed in field 632; or the user may enter the amount of money to be paid in field 632, and the system may translate this into an amount of VC1, which may be displayed in field 631. Purchase of various amounts or threshold amounts of VC1 may permit the user to receive bonus amounts of VC2, which may be displayed in field 633, according to an aspect of the present disclosure. As noted above, VC2 may be acquired in other ways, such as, but not limited to, as incentives, via mail-in request, as giveaways, as awards for entering and/or winning contest (which may have no entrance fees), etc. In the case of a mail-in request, an operator may enter into the system information from the mail-in request that may permit the system to allot an associated amount of VC2. In a particular example, according to one aspect of this disclosure, an amount of VC1 and an amount of VC2 may be provided to the user on a daily basis, or other periodic basis, based simply upon the user logging in, as a giveaway. Other giveaways of VC1 and/or VC2 may also be used.

Upon the user entering the desired purchase amount (which may be entered, according to various aspects of this disclosure, in the form of an amount of VC1 that the user desires to acquire (entered in field 631) or in the form of an amount of money that the user desires to spend on VC1 (entered in field 632)), the user may be prompted to enter a payment method in field 634.

This may correspond to selecting a payment method, such as credit card, debit card, PayPal® or similar service, bank account information/secure login, etc., and following known payment procedures associated with the selected payment method.

Main lobby 60 may further include information about news, deals, offers, events, contests, etc., 64. These may include links to other web pages (not shown) in the gaming system (or in some cases, these may include links to web pages outside the gaming system, e.g., to news, events, partner web sites, etc.) that may permit the user to obtain further information about the news, deals, offers, events, contests, etc., and/or to participate in or take advantage of deals, offers, events, contests, etc.

Main lobby 60 may also include options 65, 66 to play regular games using VC1 65 or sweepstakes games using VC2 66. The user may select either of these and may be directed to respective lobbies associated with these options, conceptual examples of which are depicted in FIGS. 7 and 8.

Figure 7:
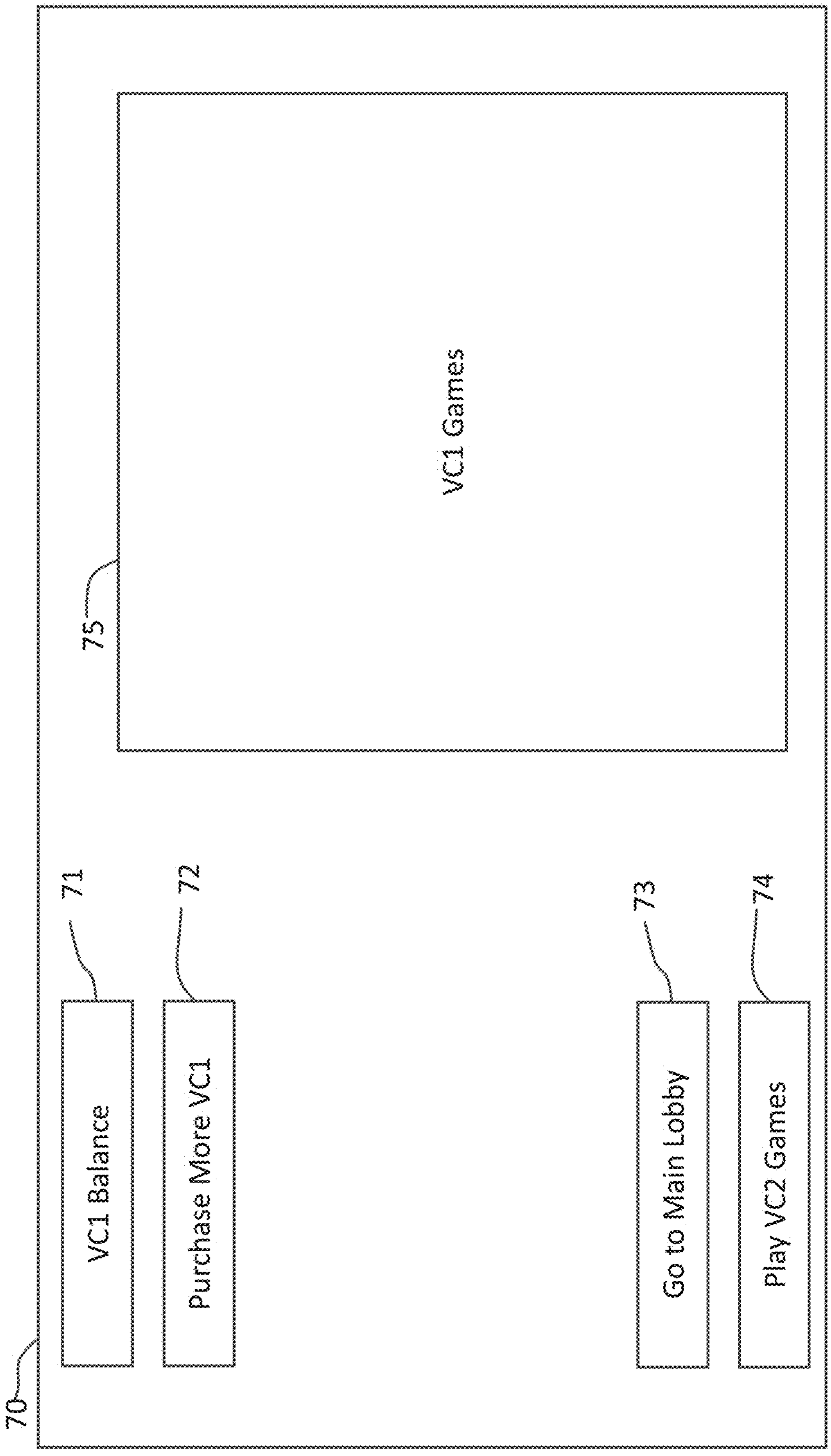
FIG. 7 shows a conceptual example of a GUI that may enable a user to play games using a first virtual currency.

FIG. 7 shows a conceptual example of a further lobby 70 to which the user may be directed if the user chooses to play VC1 games, according to aspects of the present disclosure. "VC1 lobby" 70 may show the user's VC1 balance 71 and may enable the user to purchase further VC1 72, which follows the procedures discussed above in conjunction with FIG. 6. VC1 lobby 70 may also provide options (e.g., buttons that may be clicked, or other known means of selection) 73, 74 for the user to return to main lobby 60 or to switch to a lobby that may enable the user to play VC2 games, respectively. The user may not be permitted to select a VC1 game and then choose to play the same game using VC2; rather, the user may be required to go back to main lobby 60 or to a VC2 lobby to play VC2 games. The opposite may be true for a user to be able to play a VC1 game when the user is presently in the VC2 lobby or playing a VC2 game.

VC1 lobby 70 may further include games 75 that may be selected to play using VC1. Field 75 may include one or more of listings, thumbnail depictions or icons, menus showing options for types of games and options within those types of games, etc. The user may select a game within field 75, e.g., by clicking on an icon or thumbnail depiction, selection from a list, selection using a menu, etc., and may then be directed to the game to enable play.

Figure 8:
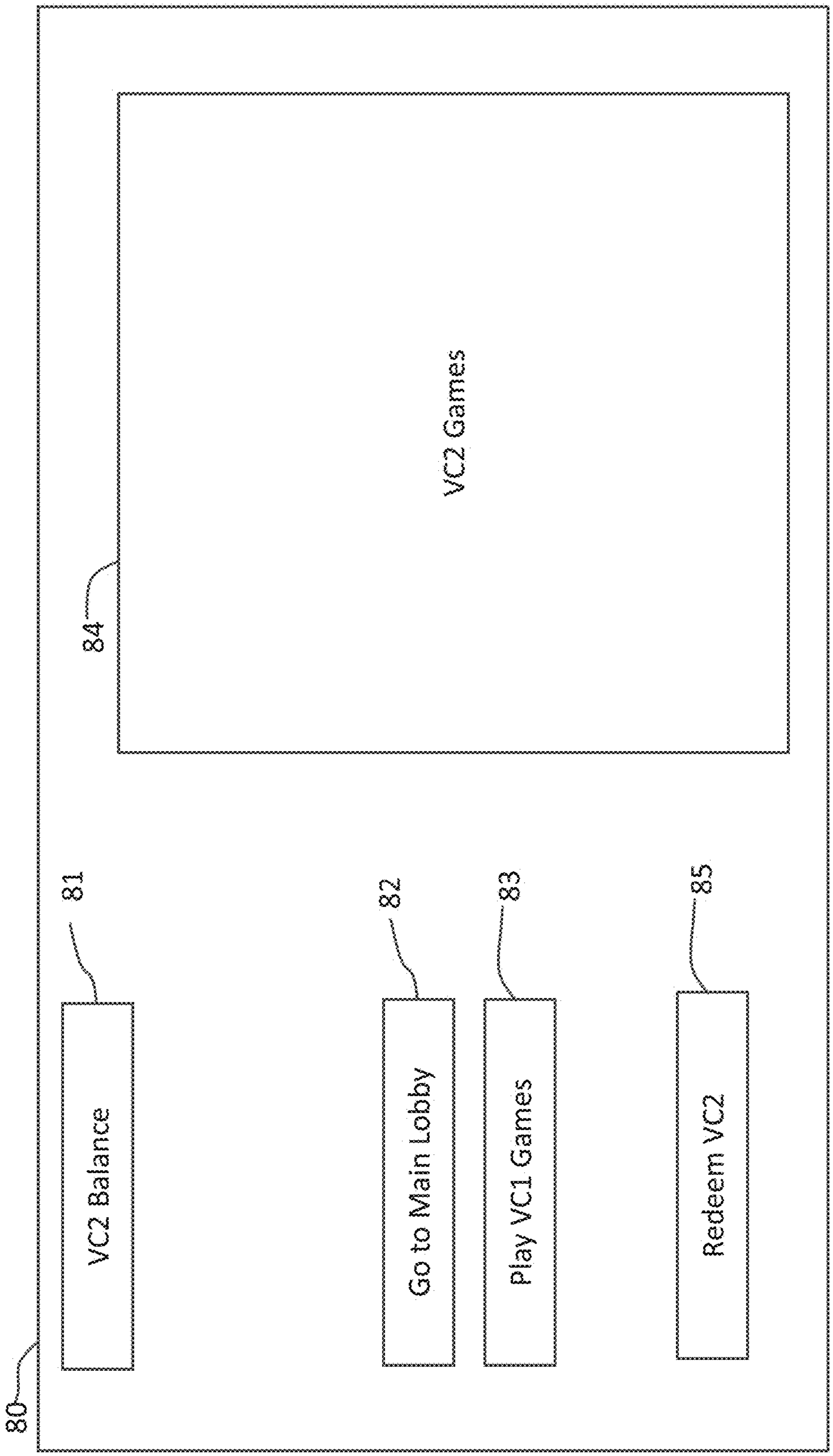
FIG. 8 shows a conceptual example of a GUI that may enable a user to play games using a second virtual currency.

FIG. 8 shows a conceptual example of a lobby 80 to which the user may be directed if the user elects to play a VC2 game, according to aspects of the present disclosure. The "VC2 lobby" 80 shown in FIG. 8 may be similar to the VC1 lobby 70 shown in FIG. 7 and may function similarly. There may be a display 81 of how much VC2 the user has, as well as respective options 82, 83 for selecting to return to main lobby 60 or to play a VC1 game, e.g., by being directed to VC1 lobby 70. Note that there is no option to purchase VC2 because VC2 is sweepstakes currency and is non-monetary/not available for purchase. However, there may be an option to redeem VC2 85, as will be discussed further below.

As was the case in FIG. 7 for the VC1 lobby 70, the VC2 lobby 80 of FIG. 8 may further contain games 84 for a user to select to play using VC2. Field 84 may be structured in any of the ways discussed above regarding field 75 of FIG. 7, and games may be selected by the user as discussed above in connection with FIG. 7.

Figure 9B:
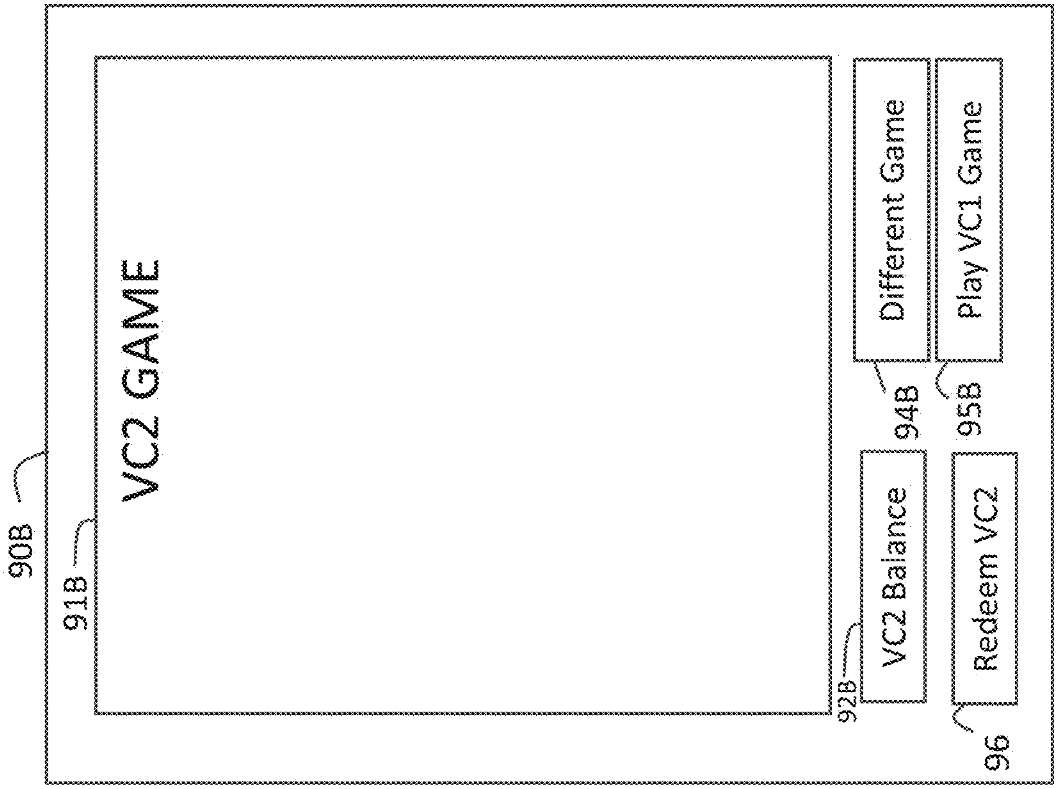
FIGS. 9A and 9B show conceptual examples of game play GUIs according to various aspects of the present disclosure.
Figure 9A:
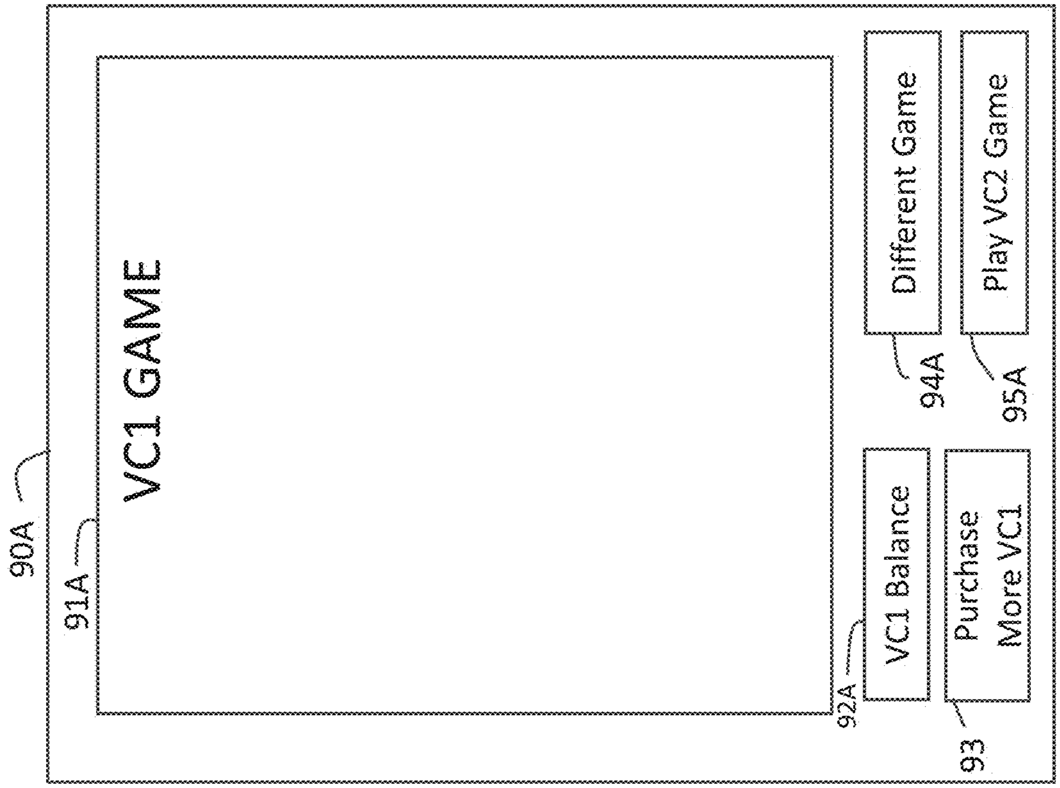

FIGS. 9A and 9B show conceptual examples of game play GUIs 90A, 90B that may appear when a user selects a game from VC1 lobby 70 and VC2 lobby 80, respectively, according to aspects of this disclosure. The respective GUIs 90A, 90B may include respective portions 91A, 91B that address the game being played. This may include fields, buttons, etc. (not shown) that may allow the user to play the game using the respective virtual currency (VC1 or VC2), to watch the play of the game and to participate where appropriate (e.g., to pull a virtual lever for a slot machine game, roll dice for a craps game, receive a card in blackjack, etc.) and/or review the outcome of the game (in addition to casino games, if, for example, sporting event-based games are facilitated).

Games may include, for example, but are not limited to, slot machine games, other types of video games, casino games (e.g., roulette, craps, etc.), sporting event-based games, etc.

If a user is playing a VC2 game in FIG. 9B and wins, the user may obtain his/her winnings in the form of VC2. VC2 may be redeemed 96 for monetary rewards or prizes of value (e.g., but not limited to, gift certificates, articles of clothing, electronics, etc.). An example of a VC2 redemption GUI, which may be reached, from VC2 lobby 80 or a VC2 game GUI 90B, is shown in FIG. 11.

Figure 11:
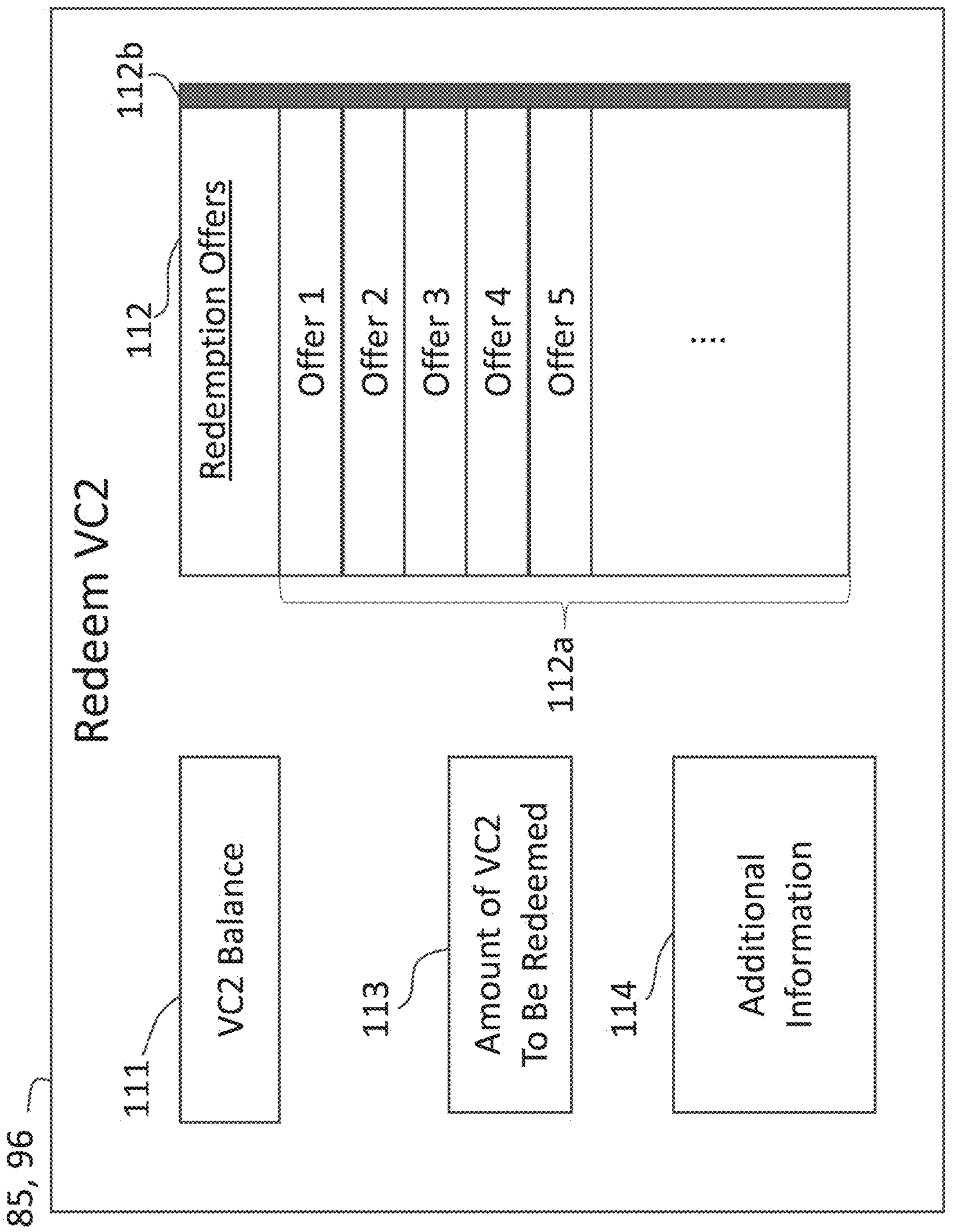
FIG. 11 shows a conceptual example of a GUI that may enable a user to redeem a virtual currency.

In the example of FIG. 11, the user may be presented with the user's VC2 balance 111; this amount may change automatically upon redemption of VC2.

A redemption offers field 112 may present to the user various offers **112*a* for redemption of VC2. In the example shown, the user may scroll 112*b* through a list of redemption offers 112*a*; however, other means of navigating the available offers 112*a* may be used, such as, but not limited to, a dropdown menu-based system. Alternatively, the redemption offers may be few enough so that the entire list of redemption offers fits in the available offers field 112 without the need to navigate through redemption offers, and if so, the user may simply select one of the redemption offers shown. These may allow the user to select a redemption offer 112*a*. One or more of the redemption offers 112*a* may be to redeem VC2 for a monetary reward, and redemption of VC2 for a monetary reward may require a minimum threshold amount of VC2, and/or various redemptions for various monetary rewards may require various set amounts of VC2. In the case of a simple threshold, the user may enter an amount of VC2 to be redeemed 113. In the case of a set amount of VC2 to be redeemed for a monetary reward or a prize, the amount of VC2 associated with a redemption offer 112***a* may be displayed in field 113 upon selection of the redemption offer 112*a*.

In the case of redemption of VC2 for a monetary reward, the user may be required to provide various types of information 114. This may include, for example, but is not limited to PayPal® or similar service information, bank account information, etc. At least in some cases, the user may be sent "know your customer (KYC)" documentation to fill in and submit prior to redemption. In the case of redemption of VC2 for a prize, if the prize is, for example, a gift certificate, this may be sent to the user's e-mail address as an e-certificate; however, if the prize is an object, the user may be prompted to enter an address to which the prize may be sent.

Many types of VC2 games may be provided. One type of VC2 game may correspond to a random drawing of a winner, selected from among the entrants. In this case, the game play field 91B may simply allow a player to enter the game using a fixed amount of VC2, and the player may be assigned a number that, if randomly selected, results in the user winning an amount of VC2. The random selection may be displayed in many forms, such as, but not limited to, a spinning wheel (e.g., like a roulette wheel) or numbers appearing in boxes or on balls (e.g., like a lottery drawing). A simple alternative may be to indicate the winning number, or to simply display whether the player has won or lost. Another type of VC2 game may correspond to a virtual slot machine. Other types of games are contemplated.

In addition to game play fields 91A, 91B, game play GUIs 90A, 90B may include respective displays of the user's respective virtual currency balances 92A, 92B. In the case of VC1, GUI 90A may offer the user the opportunity to purchase additional VC1 93, in a fashion similar to that discussed above; because VC2 may not be available for purchase, this option does not appear in GUI 90B. In each case, the respective GUI may also include an option 94A, 94B that the user may select to play a different game using the same virtual currency; selecting this option may return the user to the VC1 lobby 70 or the VC2 lobby 80, respectively, from which the user may then select another game to play using the same virtual currency. The user may also be provided with an option 95A, 95B to play games using the other virtual currency; selection of this option may send the user to the lobby associated with the virtual currency that the user is not currently using. For example, if the user is currently playing a VC1 game, selecting option 95A may send the user to VC2 lobby 80 (and vice versa).

Figure 10:
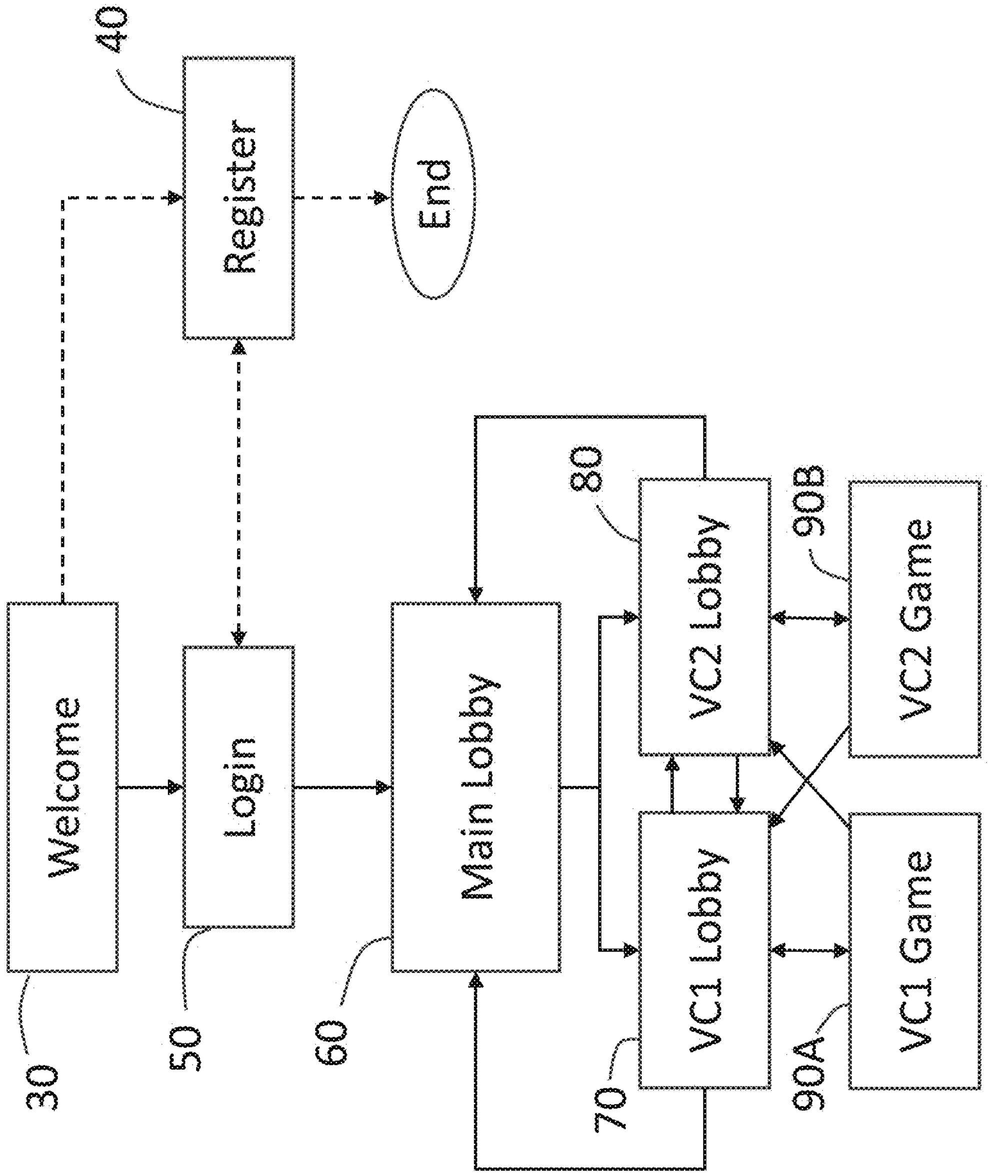
FIG. 10 shows a conceptual flow diagram of a gaming system GUI incorporating the examples of FIGS. 3-9B, according to various aspects of the present disclosure.

FIG. 10 shows a conceptual flow diagram of an example of an overall GUI for a gaming system incorporating various ones of the above-described features, according to aspects of the present disclosure. A user may initially go to a welcome screen/GUI 30, at which the system may enable the user to login 50, or if the user does not yet have an account, to register and create an account 40. FIG. 10 also accounts for a case in which the user may choose to login 50 without having previously registered and may be directed by the system to or may choose to register 40. If registration information may be verified quickly, for example, but not limited to, less than five minutes, the system may direct the user to login screen 50; if this is not possible, the system may notify the user that the creation of an account requires more time and that to play games, the user may need to attempt to login at a later time or date, at which point the process for that user may end. In conjunction with this, the system may generate a notification e-mail, SMS message, telephone call, etc., to notify the user that the user has successfully registered. Assuming that the user has a registered account in the gaming system, the user may be enabled to "enter" main lobby 60, described above. From main lobby 60, the user may be provided with options to do several things discussed above, including choosing to play a VC1 game or a VC2 game. If the user chooses to play a VC1 game, then the user may be directed by the system to VC1 lobby 70, and if the user chooses to play a VC2 game, the user may be directed by the system to VC2 lobby 80. If the user changes his/her mind, the user may choose to be directed from VC1 lobby 70 to VC2 lobby 80, or vice versa, and the system may provide the associated GUI. The system may also enable the user to choose to return to main lobby 60. As discussed above, a user in VC1 lobby 70 may choose and be directed to a VC1 game 90A, and a user in VC2 lobby 80 may choose and be directed to a VC2 game 90B. From a VC1 game 90A, the user may choose to return to VC1 lobby 70 (e.g., to select a different VC1 game), or the user may choose to move to VC2 lobby 80 to play a VC2 game.

Analogous choices may be made by the user if the user is in a VC2 game 90B (i.e., to choose to go back to VC2 lobby 80 or to VC1 lobby 70).

It is noted that the user may not be provided with a choice to play the same game using either VC1 or VC2. Rather, separate sets of games are provided for VC1 and VC2, and a user may play a VC1 game via VC1 lobby 70 or a VC2 game via VC2 lobby 80. Again, this may serve to eliminate confusion between which of the currencies, VC1 or VC2, the user is currently using.

While the above aspects of this disclosure relate to providing a user with GUIs to provide options related to two virtual currencies, VC1 and VC2, the system may be adapted to enable the use of more than two virtual currencies. For example, a third virtual currency, VC3, may be available for use, and the system may provide a VC3 lobby GUI and may enable similar choices to move among GUIs as described in connection with the use of VC1 and VC2 as described above.

Various aspects of the disclosure have been presented above. However, the invention is not intended to be limited to the specific aspects presented above, which have been presented for purposes of illustration. Rather, the invention extends to functional equivalents as would be within the scope of the appended claims. Those skilled in the art, having the benefit of the teachings of this specification, may make numerous modifications without departing from the scope and spirit of the invention in its various aspects.

What is claimed is:

1. A computer-implemented method of operating a gaming system, the method including:

providing, by at least one server of the gaming system, via at least one communication network, a first graphical user interface (GUI) displayed on a display of a client device used by a user, wherein the first GUI enables the user to select to purchase a first virtual currency, wherein the first virtual currency is used for playing a set of games associated with the first virtual currency, and wherein the first GUI provides a first selecting arrangement that enables the user to select between sets of games to play, wherein a first set of games is able to be played only using the first virtual currency and a second set of games is able to be played only using a second virtual currency, different from the first virtual currency, wherein the second virtual currency is provided by, but is not purchased from, the gaming system;

providing, by the at least one server, via the at least one communication network, in response to the user selecting, using the first selecting arrangement, to play games using the first virtual currency, a second GUI on the client device, wherein the second GUI includes a second selecting arrangement to enable the user to select a game to play out of the first set of games; and providing, by the at least one server, via the at least one communication network, in response to the user selecting to play games using the second virtual currency, a third GUI on the client device, wherein the third GUI includes a third selecting arrangement to enable the user to select a game to play out of the second set of games, wherein selection of a game to play using the first virtual currency is only possible from the second GUI and selection of a game to play using the second virtual currency is only possible from the third GUI.

2. The method of claim 1, wherein, in response to receiving at the at least one server, via the at least one communication network, a user selection of a game using the first virtual currency, by use of the second selecting arrangement, the selected game using the first virtual currency is presented on the client device, by the at least one server, via the at least one communication network, using a fourth GUI or in response to receiving at the at least one server, via the at least one communication network, a user selection of a game using the second virtual currency, by use of the third selection arrangement, the selected game using the second virtual currency is presented on the client device, by the at least one server, via the at least one communication network, using a fifth GUI, wherein the fourth and fifth GUIs include respective fourth and fifth selecting arrangements that enable the user to select to go to the second GUI or the third GUI but not to switch directly between each other.

3. The method of claim 1, further including providing on the client device, by the at least one server, via the at least one communication network, a sixth GUI that includes a sixth selection arrangement to enable the user to redeem second virtual currency of the user for a reward having monetary value.

4. The method of claim 1, further including providing, by the at least one server, a predetermined amount of second virtual currency as a bonus upon the user purchasing some predetermined amount of the first virtual currency; as an incentive; in response to a mail-in request; as a giveaway; or as an award for winning a free contest.

5. The method of claim 1, wherein only first virtual currency is provided as a reward for winning a game played using first virtual currency and only second virtual currency is provided as a reward for winning a game played using second virtual currency.

6. The method of claim 1, further including:

enabling the user to select to move from the second GUI to the third GUI or from the third GUI to the second GUI by providing on the client device by the at least one server via the at least one communication network further respective selecting arrangements in the second and third GUIs; and enabling the user to select to move from the second GUI or the third GUI to the first GUI by providing on the client device by the at least one server via the at least one communication network further respective selecting arrangements in the second and third GUIs.

7. The method of claim 2, further including providing, by the at least one server via the at least one communication network, the user with an option to purchase additional amounts of the first virtual currency from a seventh GUI to which the user is able to select to move from the second GUI or the fourth GUI using respective selecting arrangements provided in the second GUI and the fourth GUI on the client device by the at least one server.

8. The method of claim 1, wherein the first selecting arrangement further provides to the user an option to play a third set of games using a third virtual currency, different from the first and second virtual currencies, and wherein the method further includes providing, by the at least one server, via the at least one communication network, in response to the user selecting to play games using the third virtual currency, an eighth GUI on the client device that includes an eighth selecting arrangement to enable the user to select a game to play out of the third set of games, wherein selection of a game to play using the third virtual currency is only possible from the eighth GUI.

9. The method of claim 1, wherein at least one GUI provided by the at least one server of the gaming system further enables the user to request a quantity of the first virtual currency, a quantity of the second virtual currency, or both, other than by purchase.

10. A gaming system including:

at least one server, wherein the at least one server comprises one or more processors, memory coupled to the one or more processors, and one or more input/output (I/O) interfaces coupled to the one or more processors, wherein the memory contains instructions executable by the one or more processors to cause the one or more processors to implement operations including:

providing, by the at least one server of the gaming system, via at least one communication network, a first graphical user interface (GUI) displayed on a display of a client device used by a user, wherein the first GUI enables the user to select to purchase a first virtual currency, wherein the first virtual currency is used for playing a set of games associated with the first virtual currency, and wherein the first GUI provides a first selecting arrangement that enables the user to select between sets of games to play, wherein a first set of games is able to be played only using the first virtual currency and a second set of games is able to be played only using a second virtual currency, different from the first virtual currency, wherein the second virtual currency is provided by, but is not purchased from, the gaming system;

providing, by the at least one server, via the at least one communication network, in response to the user selecting, using the first selecting arrangement, to play games using the first virtual currency, a second GUI on the client device, wherein the second GUI includes a second selecting arrangement to enable the user to select a game to play out of the first set of games; and providing, by the at least one server, via the at least one communication network, in response to the user selecting to play games using the second virtual currency, a third GUI on the client device, wherein the third GUI includes a third selecting arrangement to enable the user to select a game to play out of the second set of games, wherein selection of a game to play using the first virtual currency is only possible from the second GUI and selection of a game to play using the second virtual currency is only possible from the third GUI.

11. The gaming system of claim 10, wherein, in response to receiving at the at least one server, via the at least one communication network, a user selection of a game using the first virtual currency, by use of the second selecting arrangement, the selected game using the first virtual currency is presented on the client device, by the at least one server, via the at least one communication network, using a fourth GUI, or in response to receiving at the at least one server, via the at least one communication network, a user selection of a game using the second virtual currency, by use of the third selection arrangement, the selected game using the second virtual currency is presented on the client device, by the at least one server, via the at least one communication network, using a fifth GUI, wherein the fourth and fifth GUIs include respective fourth and fifth selecting arrangements that enable the user to select to go to the second GUI or the third GUI but not to switch directly between each other.

12. The gaming system of claim 10, wherein the operations further include providing on the client device, by the at least one server, via the at least one communication network, a sixth GUI that includes a sixth selection arrangement to enable the user to redeem second virtual currency of the user for a reward having monetary value.

13. The gaming system of claim 10, wherein the operations further include providing the second virtual currency as a bonus upon the user purchasing some predetermined amount of the first virtual currency; as an incentive; in response to a mail-in request; as a giveaway; or as an award for winning a free contest.

14. The gaming system of claim 10, wherein only first virtual currency is provided as a reward for winning a game played using first virtual currency, and only second virtual currency is provided as a reward for winning a game played using second virtual currency.

15. The gaming system of claim 10, wherein the operations further include:

enabling the user to select to move from the second GUI to the third GUI or from the third GUI to the second GUI by providing on the client device by the at least one server via the at least one communication network further respective selecting arrangements in the second and third GUIs; and enabling the user to select to move from the second GUI or the third GUI to the first GUI by providing on the client device by the at least one server via the at least one communication network further respective selecting arrangements in the second and third GUIs.

16. The gaming system of claim 11, wherein the operations further include providing, by the at least one server via the at least one communication network, the user with an option to purchase additional amounts of the first virtual currency from a seventh GUI to which the user is able to select to move from the second GUI or the fourth GUI using respective selecting arrangements provided in the second GUI and the fourth GUI on the client device by the at least one server.

17. The gaming system of claim 10, wherein the first selecting arrangement further provides to the user an option to play a third set of games using a third virtual currency, different from the first and second virtual currencies, and wherein the method further includes providing, by the at least one server, via the at least one communication network, in response to the user selecting to play games using the third virtual currency, an eighth GUI on the client device that includes an eighth selecting arrangement to enable the user to select a game to play out of the third set of games, wherein selection of a game to play using the third virtual currency is only possible from the eighth GUI.

18. The gaming system of claim 10, wherein at least one GUI provided by the at least one server further enables the user to request a quantity of the first virtual currency, a quantity of the second virtual currency, or both, other than by purchase.

19. A non-transitory computer-readable medium containing instructions executable by at least one server of a gaming system to cause the at least one server to implement operations including:

providing, by the at least one server of the gaming system, via at least one communication network, a first graphical user interface (GUI) displayed on a display of a client device used by a user, wherein the first GUI enables the user to select to purchase a first virtual currency, wherein the first virtual currency is used for playing a set of games associated with the first virtual currency, and wherein the first GUI provides a first selecting arrangement that enables the user to select between sets of games to play, wherein a first set of games is able to be played only using the first virtual currency and a second set of games is able to be played only using a second virtual currency, different from the first virtual currency, wherein the second virtual currency is provided by, but is not purchased from, the gaming system;

providing, by the at least one server, via the at least one communication network, in response to the user selecting, using the first selecting arrangement, to play games using the first virtual currency, a second GUI on the client device, wherein the second GUI includes a second selecting arrangement to enable the user to select a game to play out of the first set of games; and providing, by the at least one server, via the at least one communication network, in response to the user selecting to play games using the second virtual currency, a third GUI on the client device, wherein the third GUI includes a third selecting arrangement to enable the user to select a game to play out of the second set of games, wherein selection of a game to play using the first virtual currency is only possible from the second GUI and selection of a game to play using the second virtual currency is only possible from the third GUI.

20. The medium of claim 19, wherein, in response to receiving at the at least one server, via the at least one communication network, a user selection of a game using the first virtual currency, by use of the second selecting arrangement, the selected game using the first virtual currency is presented on the client device, by the at least one server, via the at least one communication network, using a fourth GUI or in response to receiving at the at least one server, via the at least one communication network, a user selection of a game using the second virtual currency, by use of the third selection arrangement, the selected game using the second virtual currency is presented on the client device, by the at least one server, via the at least one communication network, using a fifth GUI, wherein the fourth and fifth GUIs include respective fourth and fifth selecting arrangements that enable the user to select to go to the second GUI or the third GUI but not to switch directly between each other.

21. The medium of claim 19, wherein the operations further include providing on the client device, by the at least one server, via the at least one communication network, a sixth GUI that includes a sixth selection arrangement to enable the user to redeem second virtual currency of the user for a reward having monetary value.

22. The medium of claim 19, wherein the operations further include providing the second virtual currency as a bonus upon the user purchasing some predetermined amount of the first virtual currency; as an incentive; in response to a mail-in request; as a giveaway; or as an award for winning a free contest.

23. The medium of claim 19, wherein only first virtual currency is provided as a reward for winning a game played using first virtual currency, and only second virtual currency is provided as a reward for winning a game played using second virtual currency.

24. The medium of claim 19, wherein the operations further include:

enabling the user to select to move from the second GUI to the third GUI or from the third GUI to the second GUI by providing on the client device by the at least one server via the at least one communication network further respective selecting arrangements in the second and third GUIs; and enabling the user to select to move from the second GUI or the third GUI to the first GUI by providing on the client device by the at least one server via the at least one communication network further respective selecting arrangements in the second and third GUIs.

25. The medium of claim 20, wherein the operations further include providing, by the at least one server via the at least one communication network, the user with an option to purchase additional amounts of the first virtual currency from a seventh GUI to which the user is able to select to move from the second GUI or the fourth GUI using respective selecting arrangements provided in the second GUI and the fourth GUI on the client device by the at least one server.

26. The medium of claim 19, wherein the first selecting arrangement further provides to the user an option to play a third set of games using a third virtual currency, different from the first and second virtual currencies, and wherein the method further includes providing, by the at least one server, via the at least one communication network, in response to the user selecting to play games using the third virtual currency, an eighth GUI on the client device that includes an eighth selecting arrangement to enable the user to select a game to play out of the third set of games, wherein selection of a game to play using the third virtual currency is only possible from the eighth GUI.

27. The medium of claim 19, wherein at least one GUI provided by the at least one server of the gaming system further enables the user to request a quantity of the first virtual currency, a quantity of the second virtual currency, or both, other than by purchase.

* * * * *